Aug. 3, 1948.　　　M. W. NEWBERRY　　　2,446,302
COLLAPSIBLE AND INFLATABLE BABY CARRIAGE
Filed Sept. 7, 1945
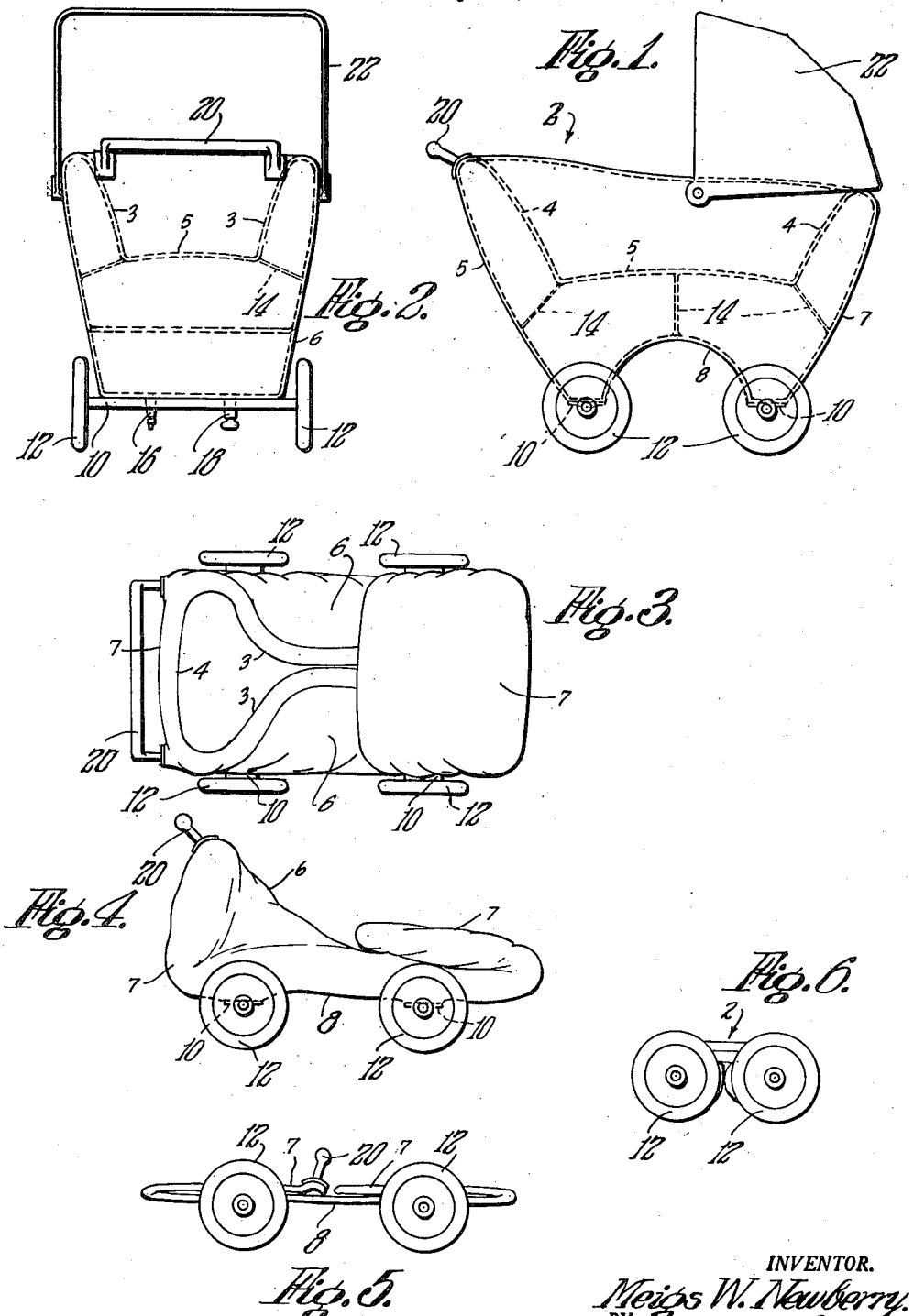
INVENTOR.
Meigs W. Newberry.

Patented Aug. 3, 1948

2,446,302

UNITED STATES PATENT OFFICE 2,446,302

COLLAPSIBLE AND INFLATABLE BABY CARRIAGE

Meigs W. Newberry, South Windsor, Conn.

Application September 7, 1945, Serial No. 614,906

1 Claim. (Cl. 280—36)

This invention relates to improvements in collapsible vehicles and is directed more particularly to improvements in a collapsible baby carriage.

The principal objects of the invention are directed to the provision of a collapsible vehicle such as a baby carriage which is characterized by a double walled body adapted to be inflated with any suitable medium such as air so as to provide when in set up relation a novel vehicle.

According to the invention the carriage is economical to manufacture and is light in weight and when in set up relation it has all of the desirable qualities of an ordinary carriage. That is it has the desired and necessary yieldability for comfort without the usual upholstery and is so constructed and arranged as to eliminate squeaks and rattles so common with conventional carriages.

The yieldable or resilient nature of the construction is such as to obviate the necessity of springs or the like.

The carriage is readily and easily inflated for assuming its set up relation and is likewise deflated for forming into a relatively small package such as may be packed in a suit case or the like.

Numerous objects and advantages of the invention may be observed from the following description of the present preferred form thereof, it being understood that various changes and modifications may be made in the form of the invention without departing from the spirit and scope thereof.

In the drawings:

Figs. 1 and 2 are side elevational, end elevational views, respectively, of a vehicle embodying the novel features of the invention, Fig. 3 is a plan view of the device of the invention partially collapsed, and Figs. 4, 5 and 6 are side elevational views showing how the vehicle may be collapsed.

Referring now to the drawings more in detail the invention will be fully described.

A body 2 is provided which has inner side, end and bottom walls numbered 3, 4 and 5 respectively and which has outer side, end and bottom walls numbered 6, 7 and 8 respectively, all as shown. The outer and inner walls are constructed and arranged to provide a space therebetween for air or some other suitable gas for inflation of the body.

The lower wall has axles 10 secured thereto which may be of any desired form and wheels 12 are rotatable on the opposite ends thereof.

The walls may be made from any suitable material such as rubber, fabric or whatever may be desired that is substantially leak proof against air or the particular medium with which the body is to be inflated.

It may be desirable to provide ties such as 14 between the outer and inner wall forming members in order to maintain the said members in the desired wall forming relation.

An inlet valve 16 is provided in one of the outer wall forming members as is an outlet valve 18. The former is for attachment to a conduit or other means when it is desired to inflate the body while the latter is for readily releasing the inflating medium when the body is to be deflated.

A handle member 20 may be associated with one of the end walls while a hood 22 may be releasably associated with the other end wall. The latter may be arranged for ready removal from the body and may be collapsible so as to occupy small space.

With the body in inflated set up relation it assumes the shape substantially as shown in Figs. 1 and 2 but of course the wall forming members may be varied as desired to provide a different shape and obviously the body may be formed by any fabricating or molding operation desired.

When in set up relation the construction is such as to provide the desired resiliency and comfort and the occupant is free from shocks and the like.

When it is desired to collapse the carriage the valve 18 is opened to release the inflating medium.

The body may then be folded or rolled up by first bringing the side walls inwardly over the bottom wall and then swinging one end wall inwardly thereover, approximately as shown in Figs. 3 and 4. Then the opposite end wall is brought inwardly to the position shown in Fig. 5.

The superposing of the walls about as described expels the inflating medium so that when the body is in the condition of Fig. 5 the body may be rolled up with the axles to form a compact package as shown in Fig. 6.

In such form the body may be readily packed in a suit case or the like for shipment or carrying. Then it will be seen that the construction is such that the carriage may be packaged into small space for convenience in carrying the same while at the same time it is light in weight. It may be easily and readily inflated so as to provide a carriage having comfortable qualities while being free from rattles and squeaks as well as being readily manipulatable.

Various changes and modifications may be made in the form of the invention without departing from the spirit and scope thereof and therefore I prefer to be limited if at all by the appended claim.

What it is desired to claim and secure by Letters Patent of the United States is:

An inflatable baby carriage structure comprising in combination, an outer bottom wall, connected together opposite side and end outer walls having lower edges thereof connected to opposite and adjacent edges of said outer bottom wall, an inner bottom wall, connected together opposite side and end inner walls having lower edges thereof connected to opposite and adjacent edges of said inner bottom wall, each of said walls being formed from stretchable material substantially impervious to air and the upper edges of said inner and outer side and end walls being connected together providing with said inner and outer bottom walls an air tight compartment, axles secured to said outer bottom wall in spaced relation and having wheels at opposite ends thereof, and valve mechanisms in one of said walls adapted for the passage of air into and out of the compartment, all adapted and arranged whereby air may be admitted into the compartment to inflate the compartment so that said inner and outer side and end walls extend upwardly from said inner and outer bottom walls with said outer and inner walls being in spaced relation or whereby air may be discharged from the compartment to deflate the compartment so that said inner and outer side walls may be disposed inwardly over said inner and outer bottom walls and said inner and outer end walls may be disposed inwardly over said inner and outer bottom walls and side walls and so that all of said walls may then be rolled up with said axles to form a compact package.

MEIGS W. NEWBERRY.

REFERENCES CITED

The following references are of record in the file of this patent:

UNITED STATES PATENTS

| Number | Name | Date |
|---|---|---|
| D. 62,173 | Pearson | Apr. 3, 1923 |
| D. 137,707 | Fink | Apr. 18, 1944 |
| 2,150,434 | Finlay | Mar. 14, 1939 |
| 2,223,625 | Krupp | Dec. 3, 1940 |
| 2,264,321 | Manson | Dec. 2, 1941 |
| 2,350,679 | Hann | June 6, 1944 |

FOREIGN PATENTS

| Number | Country | Date |
|---|---|---|
| 19,769 | Great Britain | Sept. 17, 1898 |